United States Patent [19]
Evans

[11] Patent Number: 5,879,495
[45] Date of Patent: Mar. 9, 1999

[54] PVC PALLETS AND THE LIKE

[75] Inventor: Daniel W. Evans, Duluth, Ga.

[73] Assignee: Composite Pallet, L.L.C., Duluth, Ga.

[21] Appl. No.: 997,576

[22] Filed: Dec. 23, 1997

[51] Int. Cl.⁶ .................................................. B29C 47/08
[52] U.S. Cl. .................... 156/82; 156/153; 156/244.13; 156/256; 156/272.6; 156/281; 156/308.6; 427/223; 427/316; 427/322; 427/412.1
[58] Field of Search ............... 156/82, 153, 272.2, 156/272.6, 281, 308.6, 244.11, 244.13, 250, 256; 427/223, 316, 322, 412.1

[56] References Cited

U.S. PATENT DOCUMENTS

| | | |
|---|---|---|
| 2,520,959 | 9/1950 | Powers .................................. 260/92.8 |
| 3,026,289 | 3/1962 | Coover, Jr. ............................ 260/45.5 |
| 3,100,917 | 8/1963 | Wagner .................................... 20/16 |
| 3,145,190 | 8/1964 | Gateff et al. .......................... 260/45.5 |
| 3,242,234 | 3/1966 | Frey et al. ............................... 260/897 |
| 3,567,669 | 3/1971 | Georgiana et al. .................... 260/23.7 |
| 3,581,681 | 6/1971 | Newton ................................... 108/51 |
| 3,603,272 | 9/1971 | Ditges ..................................... 108/51 |
| 3,613,605 | 10/1971 | Holdredge, Jr. ........................ 108/58 |
| 3,628,468 | 12/1971 | Angelbeck, Jr. ........................ 108/53 |
| 3,636,888 | 1/1972 | Angelbeck, Jr. ........................ 108/51 |
| 3,667,403 | 6/1972 | Angelbeck, Jr. ........................ 108/58 |
| 3,680,496 | 8/1972 | Westlake, Jr. .......................... 108/58 |
| 3,710,733 | 1/1973 | Story ....................................... 108/51 |
| 3,719,157 | 3/1973 | Arcocha et al. ........................ 108/51 |
| 3,814,031 | 6/1974 | Fowler .................................... 108/51 |
| 3,833,686 | 9/1974 | Grochowski et al. ............. 260/876 R |
| 3,878,796 | 4/1975 | Morrison ............................... 108/56 |
| 3,907,934 | 9/1975 | Dall'Asta et al. ...................... 260/899 |
| 3,938,448 | 2/1976 | Nishitani et al. ....................... 108/58 |
| 3,951,078 | 4/1976 | Fowler et al. .......................... 108/51 |
| 3,966,529 | 6/1976 | Kuroda ................................... 156/300 |
| 3,996,173 | 12/1976 | Heichele et al. ..................... 260/23 X |
| 4,007,694 | 2/1977 | Fowler et al. ........................ 108/55.1 |
| 4,230,049 | 10/1980 | Horne ................................... 108/51.1 |
| 4,443,585 | 4/1984 | Goldman ................................ 525/310 |
| 4,467,728 | 8/1984 | Horne ................................... 108/51.1 |
| 4,513,108 | 4/1985 | Jones ..................................... 524/180 |
| 4,668,740 | 5/1987 | Okano .................................... 525/227 |
| 4,714,650 | 12/1987 | Obayashi et al. ....................... 428/265 |
| 4,775,719 | 10/1988 | Markevka et al. ...................... 525/125 |
| 4,808,255 | 2/1989 | Markevka et al. ................... 156/307.3 |
| 4,809,618 | 3/1989 | Bell ...................................... 108/51.1 |
| 4,871,406 | 10/1989 | Griffith .................................... 156/82 |
| 4,940,747 | 7/1990 | Eichenauer et al. ................... 524/504 |
| 5,042,397 | 8/1991 | Fiedler ................................. 108/51.1 |
| 5,106,564 | 4/1992 | Iwanami et al. ................... 264/211.23 |
| 5,114,510 | 5/1992 | Wright .................................... 156/82 |
| 5,185,404 | 2/1993 | Fölsch et al. .......................... 525/222 |
| 5,425,825 | 6/1995 | Rasko et al. ............................. 156/66 |
| 5,441,808 | 8/1995 | Anderson et al. ..................... 428/349 |
| 5,456,189 | 10/1995 | Belle Isle ............................. 108/51.1 |
| 5,492,069 | 2/1996 | Alexander et al. ................... 108/56.3 |
| 5,585,054 | 12/1996 | Evans ................................... 264/40.4 |
| 5,776,281 | 7/1998 | Evans ................................ 156/244.17 |

FOREIGN PATENT DOCUMENTS 0426619  5/1991  European Pat. Off. .

Primary Examiner—James Sells
Attorney, Agent, or Firm—Webb Ziesenheim Bruening Logsdon Orkin & Hanson, P.C.

[57] ABSTRACT

A PVC pallet or crate is disclosed, wherein the pallet is made from PVC structural products such as hollow, extruded PVC profiles. The profiles are bonded together using an adhesive. The profiles are preferably surface treated before bonding to enhance the strength of the bond. The PVC structural products preferably incorporate an acrylic polymer impact modifier in a certain amount to greatly increase the toughness of the structural product. The adhesive is preferably a hot-melt moisture-cure polyurethane adhesive. The surface treatment is preferably achieved by plasma treating or flame treatment. A method for making PVC pallets or crates is also disclosed.

7 Claims, 13 Drawing Sheets

COMPOSITE PALLET NEW COMPOUND TEST RESULTS

|  | CONTROL | 1A | 1B |
|---|---|---|---|
| PROFILE SAMPLES | | | |
| THICKNESS (IN.) | 0.090 | 0.077 | 0.088 |
| GARDNER IMPACT @ 23°C | | | |
| IN-LBS. | >320 | >320 | >320 |
| IN-LBS/MIL | >3.6 | >4.2 | >3.6 |
| GARDNER IMPACT @ 0°C | | | |
| IN-LBS. | 204 | >320 | >320 |
| IN-LBS/MIL | 2.3 | >4.2 | >3.6 |
| GARDNER IMPACT @ -20°C | | | |
| IN-LBS. | 71 | 215 | 170 |
| IN-LBS/MIL | 0.8 | 2.8 | 1.9 |
| MILL / MOLDED SAMPLES | | | |
| TENSILE STRENGTH (PSI) | 7,440 | 7,800 | 7,520 |
| TENSILE MODULUS (PSI) | 345,000 | 326,000 | 326,000 |
| ELONGATION @ BREAK (%) | 226 | 233 | 218 |
| FLEXURAL STRENGTH (PSI) | 11,440 | 11,110 | 10,920 |
| FLEXURAL MODULUS (PSI) | 419,400 | 385,800 | 388,100 |
| IZOD IMPACT @ 23°C | | | |
| FT-LBS/IN | 3.9 | 22.0 | 24.4 |
| % DUCTILITY | 0 | 100 | 100 |

*FIG.15*

ISO 8611 INTERNATIONAL STANDARD TEST
GENERAL PURPOSE FLAT PALLETS FOR THROUGH TRANSIT OF GOODS

| TEMP. | LOAD WEIGHT | MEASUREMENT | | DEFLECTION | |
|---|---|---|---|---|---|
| | | RIGHT | LEFT | RIGHT | LEFT |
| °F | LB. | IN. | IN. | IN. | IN. |
| NO LOAD | | | | | |
| 72° | 0 | 2.711 | 2.745 | - | - |
| LOAD APPLICATOR | | | | | |
| 72° | 148 | 2.681 | 2.704 | - | - |
| DATUM LOAD | | | | | |
| 72° | 288 | 2.657 | 2.674 | - | - |
| TEST LOAD | | | | | |
| 72° | 568 | 2.616 | 2.619 | 0.041 | 0.055 |
| | 988 | 2.541 | 2.551 | 0.116 | 0.123 |
| | 1,408 | 2.489 | 2.481 | 0.168 | 0.193 |
| | 1,828 | 2.423 | 2.413 | 0.234 | 0.261 |
| | 2,248 | 2.360 | 2.350 | 0.297 | 0.324 |
| | 2,668 | 2.299 | 2.271 | 0.358 | 0.403 |
| | 3,088 | 2.220 | 2.189 | 0.437 | 0.485 |
| | 3,508 | 2.162 | 2.130 | 0.495 | 0.544 |
| | 3,508 | 2.120 | 2.088 | 0.537 | 0.586 |
| | 3,508 | 2.110 | 2.083 | 0.547 | 0.591 |
| | 3,508 | 2.093 | 2.054 | 0.564 | 0.620 |
| | 3,508 | 2.024 | 2.008 | 0.633 | 0.666 |
| RECOVERY AT DATUM LOAD | | | | | |
| 72° | 288 | 2.522 | 2.500 | 0.135 | 0.174 |
| NO LOAD | | | | | |
| 72° | 0 | 2.619 | 2.600 | 0.038 | 0.074 |

*FIG.16*

40" X 48" PLASTIC 50lb. 9-BLOCK PALLET          RACKED ACROSS 48" (R.A.S.)

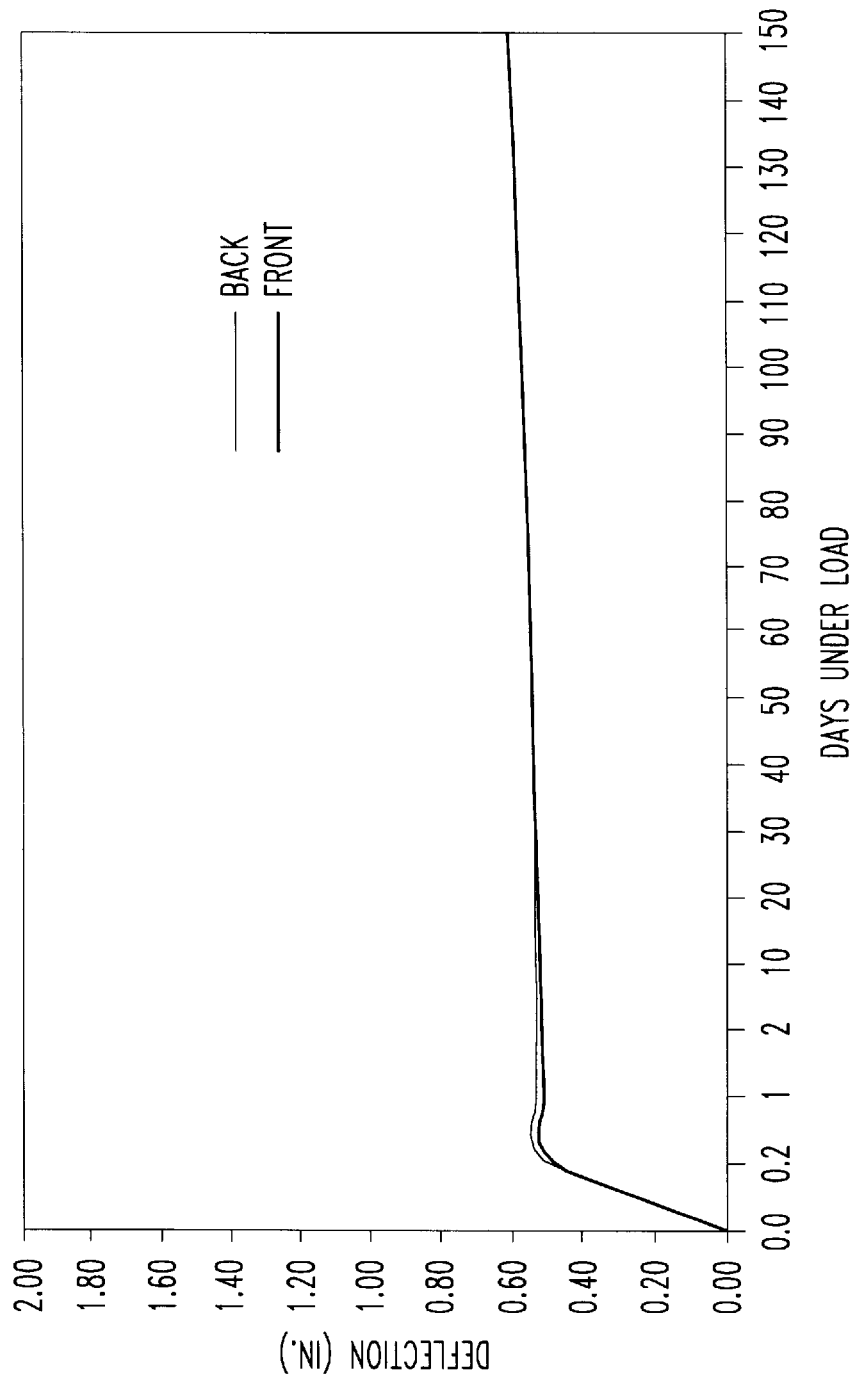

PVC PALLETS AND THE LIKE

BACKGROUND OF THE INVENTION

1. Field of the Invention

The present invention relates to polyvinyl chloride (hereinafter "PVC") pallets or crates used for support and transport of goods. Specifically, the present invention relates to PVC pallets or crates built from PVC profiles and a bonding agent, and a method of making PVC pallets or crates.

2. Description of the Prior Art

Plastic pallets have been used in warehouses for supporting various goods, such as beverages. The pallets are typically transported within the warehouse with a fork-lift truck, or a pallet-jack. Examples of prior plastic pallets can be found in U.S. Pat. Nos. 5,492,069 to Alexander et al.; 5,456,189 to Belle Isle; 5,042,397 to Fielder; 3,966,529 to Kuroda; 3,938,448 to Nishitani et al.; and 3,680,496 to Westlake. U.S. Pat. No. 5,441,808 to Anderson et. al. discloses a thermally stable hot-melt moisture-cure polyurethane adhesive composition, and the patent lists PVC, among several other substrates, for use on which the adhesive is said to be suitable. Other patents disclose the advantages of pretreating the surface of certain articles by flame treatment or corona discharge to enhance the receptiveness of an adhesive to the article surface. Examples of such pretreating can be found in U.S. Pat. Nos. 5,425,825 to George et al.; 5,114,510 to Wright; 4,871,406 to Griffith; and 4,714,650 to Saburo et al. Still other patents disclose various PVC formulations that improve the processability and performance of the formulation. Examples of PVC formulations can be found in U.S. Pat. Nos. 5,185,404 to Fölsch et al.; 4,668,740 to Okano; and 3,833,686 to Grochowski. An example of a plastic extrusion process can be found in U.S. Pat. No. 5,585,054 to Evans. None of these patents, alone or in combination, teaches or suggests a pallet or crate, or method for making a pallet or crate, that meets the stringent requirements of today's marketplace and that contains the performance advantages of traditional wood pallets while eliminating the problems associated with prior art wood and plastic pallets.

It is an object of the present invention to produce PVC structural products that have significantly improved properties when used in plastic pallets and plastic crates, namely:

1) substantially improved structural rigidity;
2) substantially improved heat deflection temperature;
3) substantially reduced coefficient of thermal expansion and contraction;
4) significantly improved impact properties;
5) significantly lower raw material costs;
6) significantly improved economics associated with the continuous extrusion process; and
7) significantly improved fire retardancy.

In addition to the above objects, it is a further object of the present invention to produce PVC pallets and crates made of the aforementioned PVC structural products that have significantly improved characteristics over wood pallets and other plastic pallets, namely:

1) significantly improved durability;
2) significantly improved ease of manufacturing;
3) significantly improved ability to customize sizes;
4) unique property of repairability;
5) full recyclability;
6) unique property of rackability;
7) substantially lighter;
8) significantly improved economics associated with the ease of assembly of the PVC structural products;
9) significantly improved economics associated with the elimination of customized tooling costs;
10) longer useful life; and
11) significantly more compatible with the environment.

SUMMARY OF THE INVENTION

These objects are accomplished by producing PVC structural products, called "profiles," preferably pretreating the profiles, applying an adhesive to the pretreated profiles and bonding the resultant profiles to other profiles in order to yield a PVC pallet or crate superior to pallets and crates disclosed in the prior art.

The PVC structural product preferably comprises a mixture of vinyl resin, an antioxidant such as methyl tin stabilizer, a UV inhibitor such as titanium dioxide, a flow processing aid such as paraffin wax, an internal mixing aid such as calcium stearate, and an impact modifier such as an acrylic polymer modifier. The mixture may or may not include a stiffness additive such as calcium carbonate. Although a filler may be present, this PVC blend is preferably unfilled in that it does not contain substantial amounts of any reinforcing agents such as glass or carbon fibers.

The PVC structural product may comprise a profile which is formed by extruding the mixture. The extruded PVC profile may take one of many shapes, such as an angle, a block, a board, a sheet, a U-channel or other desired shapes. All of these shapes may optionally contain internal reinforcing ribs.

The objects of the present invention are further achieved by providing a PVC pallet or crate comprising a plurality of parallel, spaced support members with top surfaces, a bonding agent contacting the top surface of at least one of the support members, and at least one cross member disposed transversely on the support members, a bottom side of the cross member bonded to the top surface of the support members due to adhesion of the bonding agent sandwiched therebetween. The bonding agent may be one of certain groups of adhesives, and most preferably is a hot-melt moisture-cure polyurethane adhesive. The support members and cross members also may have a surface pretreatment to enhance the strength of the bond between them. The surface pretreatment may take one of certain forms but is most preferably carried out by plasma treating or flame treating. The support members and cross members are preferably hollow, extruded PVC structural products having quadrangular cross-sections.

The invention also includes a method for making the aforementioned pallets and crates.

These and other features of the present invention will be clarified in the description, taken in conjunction with the drawings, wherein like reference numerals represent like elements throughout.

BRIEF DESCRIPTION OF THE DRAWINGS

FIG. 15 is a table showing ASTM D-3029 Gardner Impact and ASTM D-256 Notched Izod Impact Test results for two PVC blends according to the present invention ("1A" and "1B"), compared to a typical rigid PVC compound ("control");

FIG. 16 is a table showing ISO 8611 Rack Test results for a pallet built according to the invention;

FIG. 20 is a line graph showing deflection vs. load time (in days) for a two-way stringer pallet according to the invention in a long-term creep deflection test, indicating front side and back side deflection.

DETAILED DESCRIPTION OF THE PREFERRED EMBODIMENTS

Figure 1:
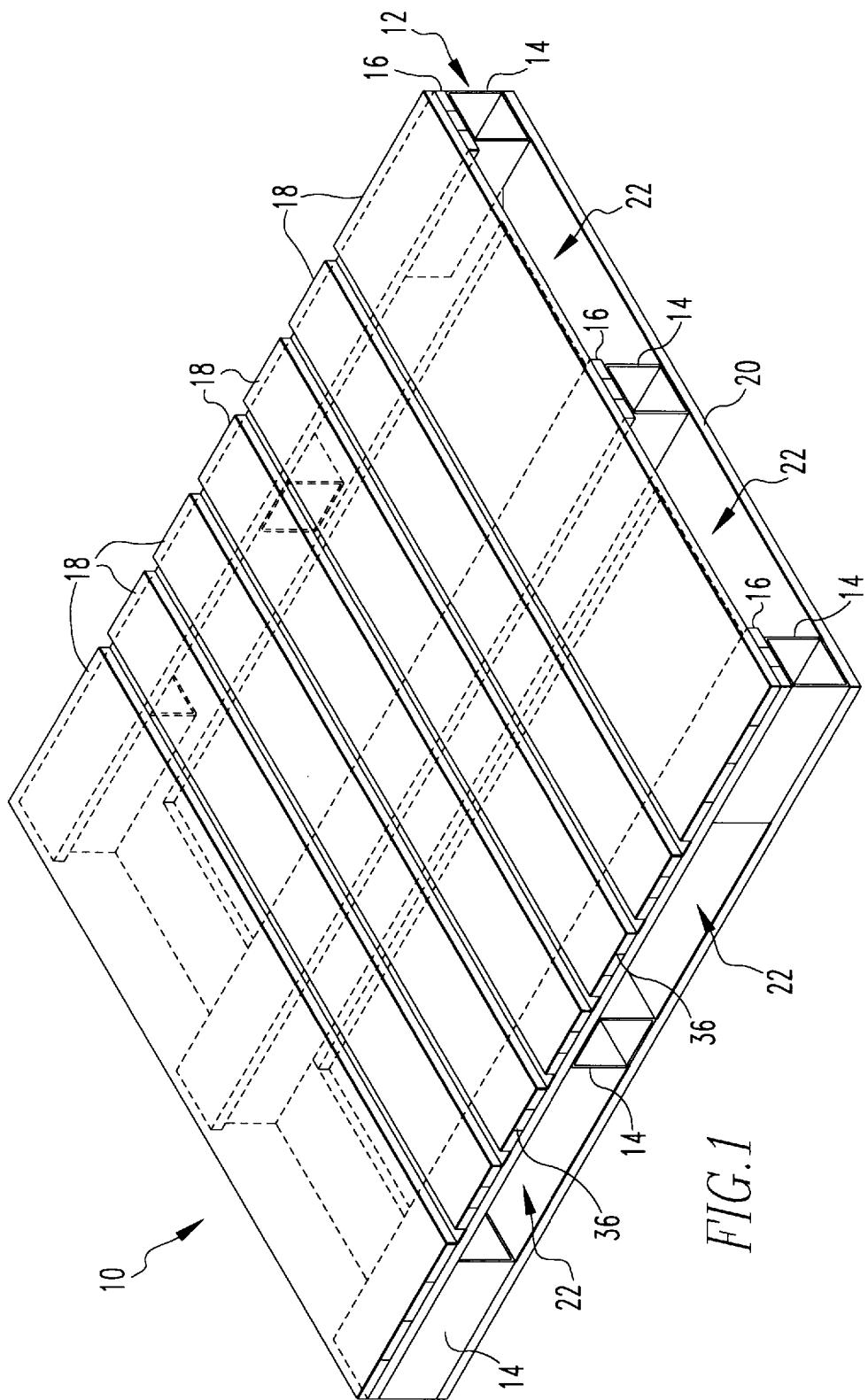
FIG. 1 is a top perspective view of a four-way pallet according to the invention.
Figure 2:
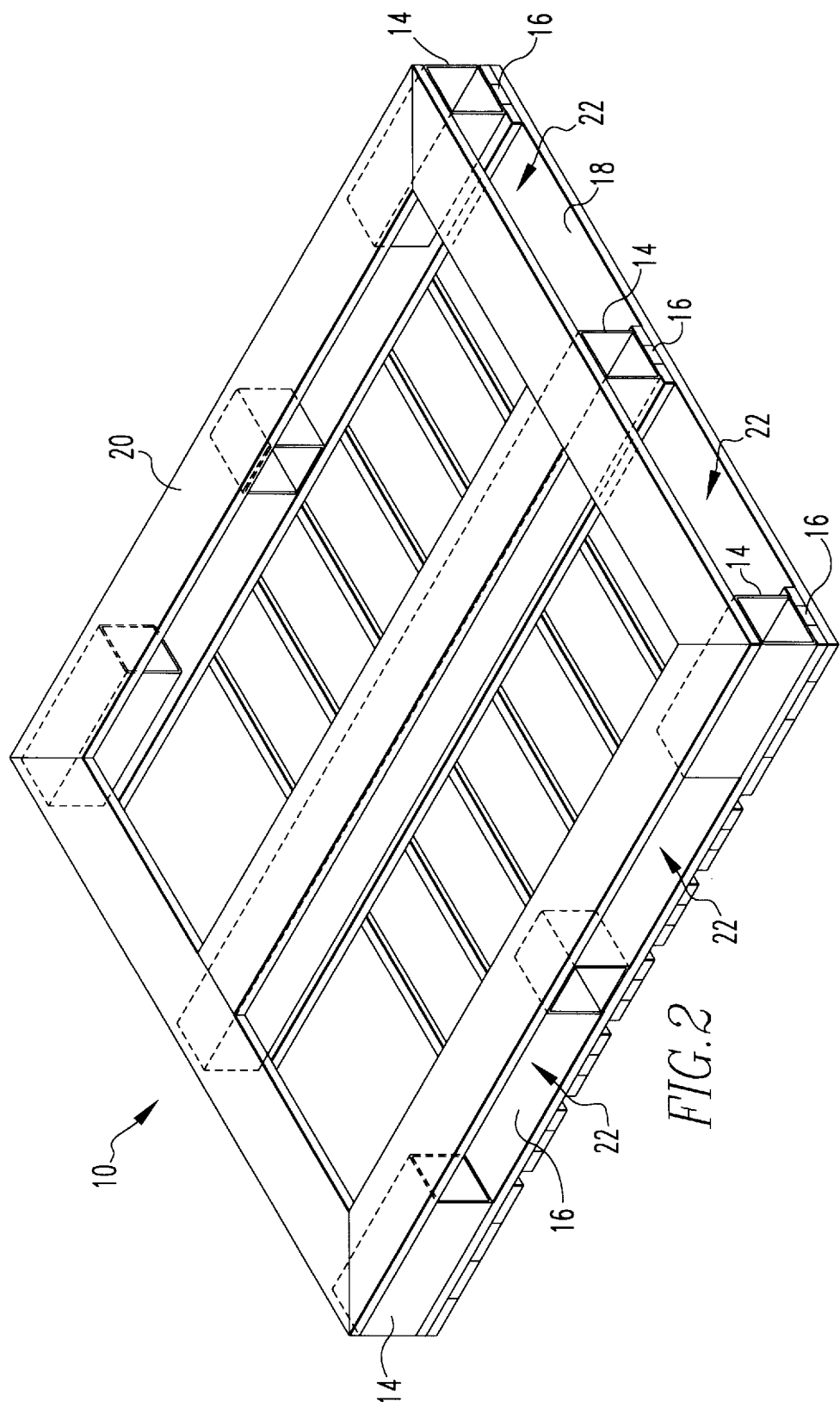
FIG. 2 is a bottom perspective view of the pallet of FIG. 1.
Figure 3:
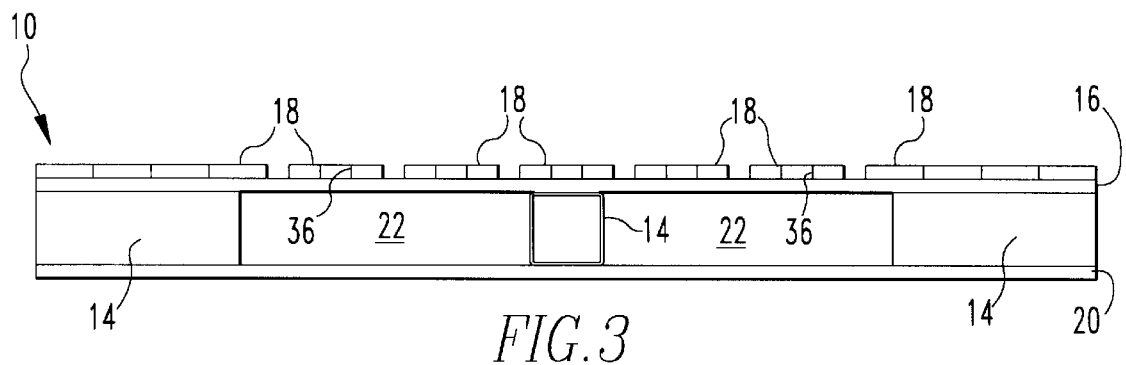
FIG. 3 is a side view of the pallet of FIG. 1.
Figure 4:
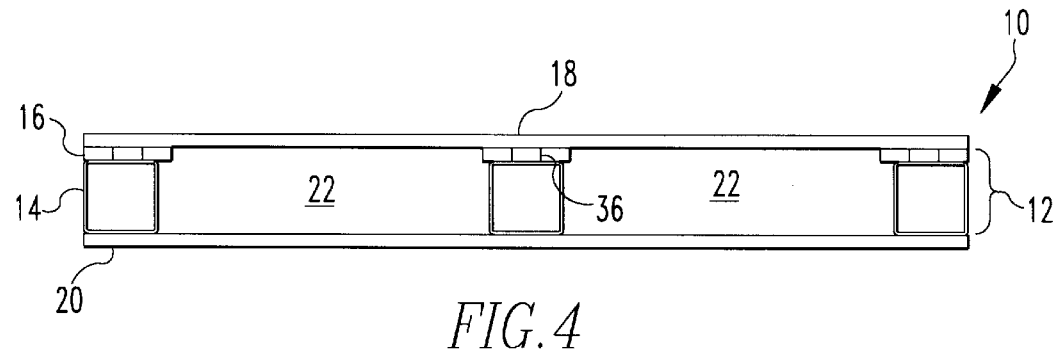
FIG. 4 is an end view of the pallet of FIG. 1.

A pallet 10 according to the invention is shown in FIGS. 1–4. The pallet 10 has a plurality of parallel, spaced support members 12, which may comprise blocks 14, either alone or in combination with stringer boards 16. A plurality of cross members 18, also called deck boards 18, are placed transversely on the stringer boards 16. The deck boards 18 are secured to the stringer boards 16 by a bonding agent sandwiched between the top surfaces of the stringer boards 16 and the bottom surfaces of the deck boards 18. A bottom frame 20 may also be incorporated in the pallet 10.

Pallet 10 is known as a four-way pallet, meaning it may be entered by a fork-lift or pallet-jack at any one of the four lateral sides of the pallet through openings 22.

Figure 5:
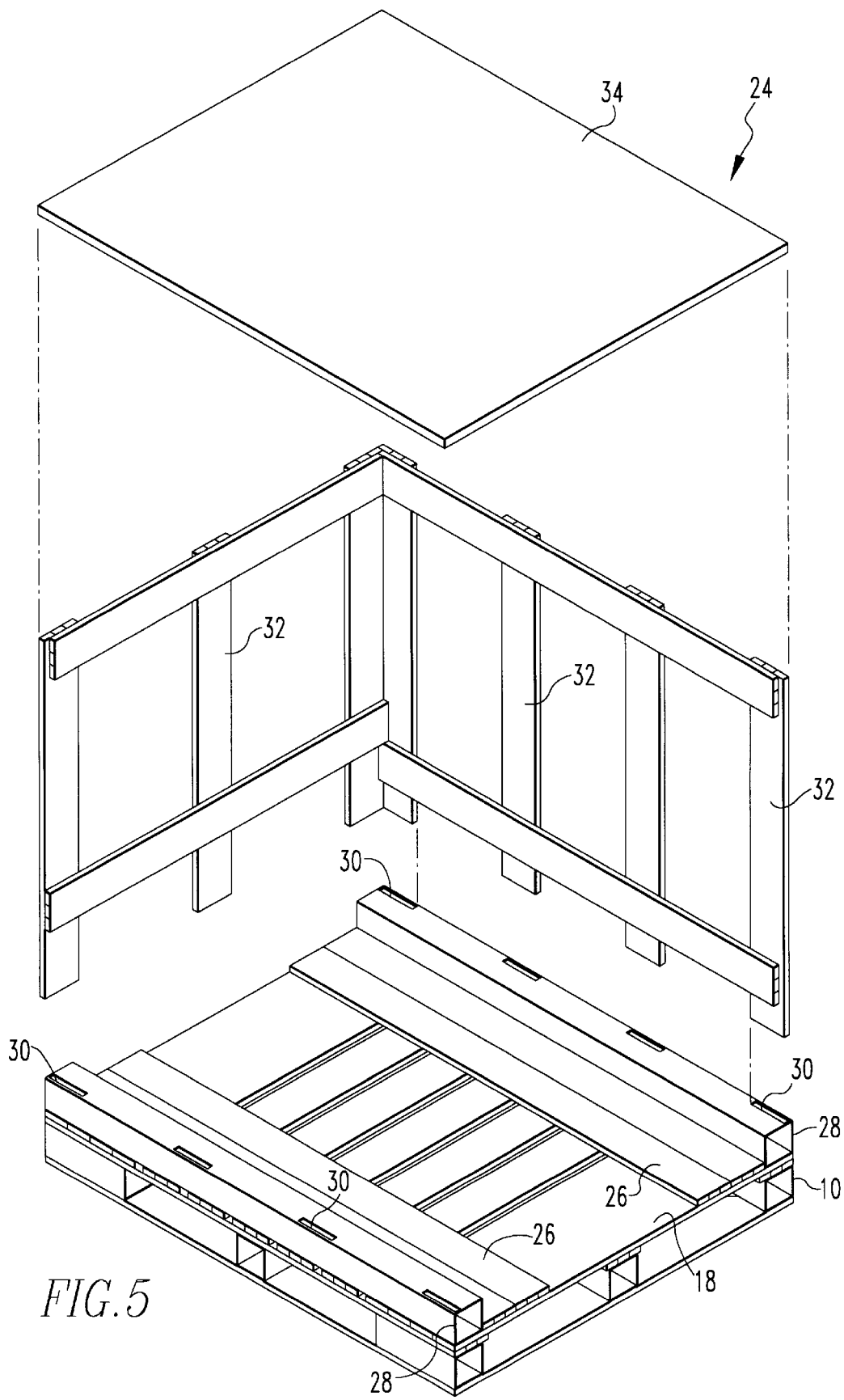
FIG. 5 is an exploded perspective view of a pallet incorporated in a crate according to the invention.
Figure 6:
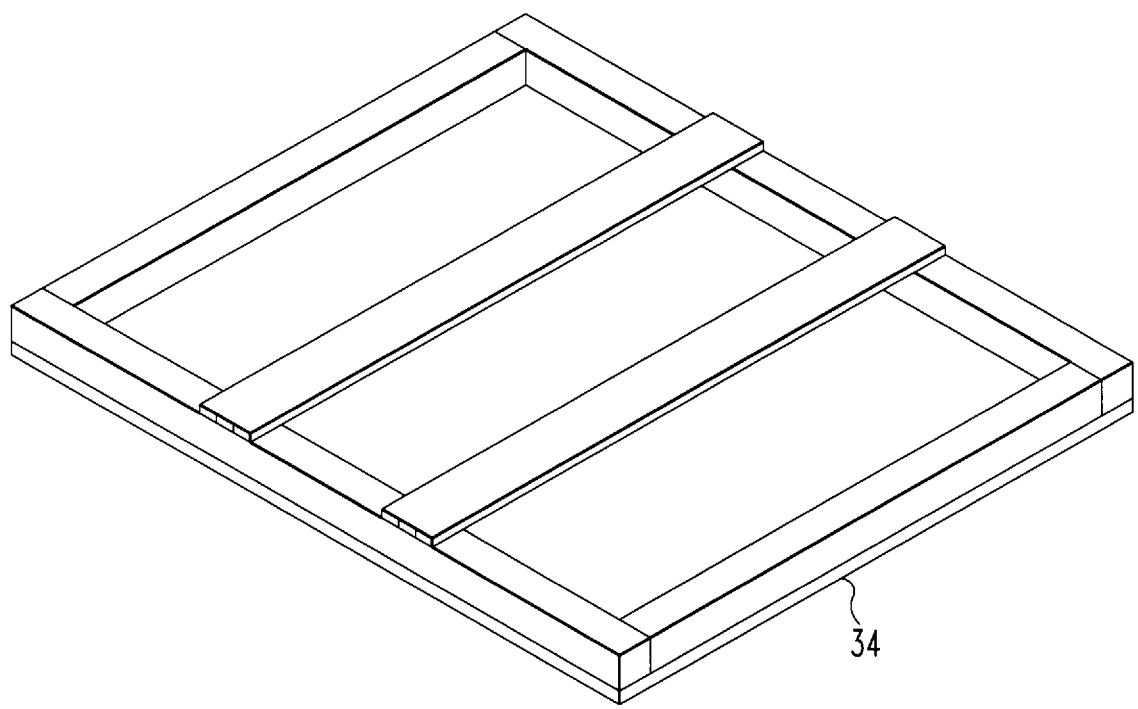
FIG. 6 is a bottom perspective view of the crate lid shown in FIG. 5.

The pallet 10 may be incorporated in a crate 24, as shown in FIG. 5. To fabricate crate 24, runner boards 26 and longitudinal anchor blocks 28 are added to the top surfaces of deck boards 18. Anchor blocks 28 have slots 30 which receive the bottom portions of vertical sidewall boards 32. Crate 24 may be open or it may be walled in, i.e., with sheeting attached to the outside surface of sidewall boards 32. A crate lid 34 may be secured in nesting fashion to the tops of sidewall boards 32. A bottom perspective view of crate lid 34 is shown in FIG. 6.

Several other configurations of pallets 10 and crates 24 are possible, utilizing the present invention. For brevity, only one pallet 10 configuration and one crate 24 configuration are shown in the instant application.

The versatile nature of the invention stems from the fact that the pallet 10 is fabricated from basic interchangeable components called "profiles". The profiles are extruded polyvinyl chloride ("PVC") structural products, cut to length and secured together by one of certain adhesives. The profiles preferably have a surface pretreatment to enhance the strength of the bond between the profiles. The surface pretreatment may take one of certain forms, but is most preferably carried out by plasma treating or flame treating.

The profiles, i.e., the blocks 14, stringer boards 16, deck boards 18, bottom frame 20, etc., are hollow, extruded PVC structural products having quadrangular cross-sections. The boards, and possibly the blocks, may be extruded to include vertical ribs 36 for increasing the structural rigidity of the boards. PVC profiles are preferably produced by a method comprising blending a mixture of vinyl resin, methyl tin stabilizer, titanium dioxide, paraffin wax, calcium stearate, and acrylic polymer modifier in a volumetric feed system, feeding the mixture into a feed chamber of a twin screw extruder, flowing the mixture through the twin screw extruder and then through a die into a bath of chilled water, bringing the bath to a set temperature for the mixture, maintaining tension on the mixture by a puller, and conveying the mixture through the puller into a compound shear configuration or a traversing saw. The length of the water bath and the subsequent set time predicates the speed with which the material flows through the die. Also, the compound shear configuration or the traversing saw cuts the extruded mixture into profiles of desired length. These profiles can be cut further to accommodate any pallet or crate size.

Figure 7:
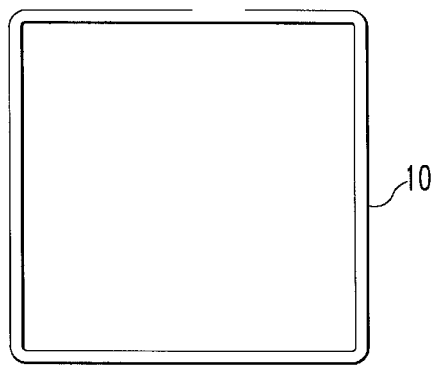
FIG. 7 is an end view of an extruded hollow block according to the invention.
Figure 8:
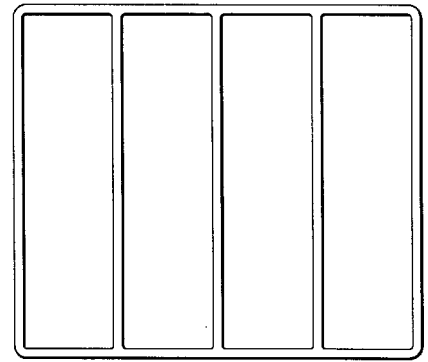
FIG. 8 is an end view of an extruded hollow block having internal reinforcing ribs, according to the invention.
Figure 9:
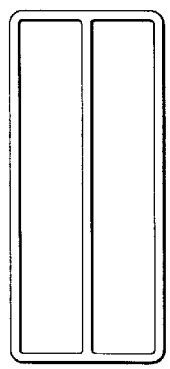
FIG. 9 is an end view of an extruded hollow board having a single internal reinforcing rib, according to the invention.
Figure 10:
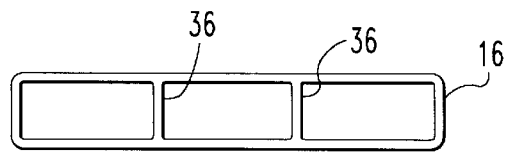
FIG. 10 is an end view of an extruded hollow board having two internal reinforcing ribs, according to the invention.
Figure 11:
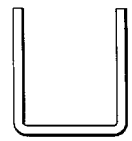
FIG. 11 is an end view of an extruded U-channel, according to the invention.
Figure 12:
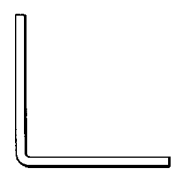
FIG. 12 is an end view of an extruded angle, according to the invention.

Having a standard set of dies for producing the extruded profiles is advantageous. The number and types of possible dies for use with the invention varies widely. By way of example only, the dies may be configured to produce a 4.0 inch by 0.5 inch deck board with vertical ribs, a 4.0 inch by 0.75 inch deck board with vertical ribs (schematically shown in FIG. 10), a 3.5 inch by 3.5 inch stringer board (FIG. 7), a 4.0 inch by 3.5 inch block with vertical ribs (FIG. 8), a 1.5 inch angle (FIG. 12), a 0.75 inch by 2.0 inch U-channel (FIG. 11), a 6.0 inch by 0.5 inch deck board with vertical ribs, a 6.0 inch by 0.75 inch deck board with vertical ribs, a 6.0 inch by 1.5 inch deck board with vertical ribs or a 2.0 inch by 0.75 inch cleat board with vertical ribs (FIG. 9). The above ten dies offer the opportunity for customers to request any number of sizes and shapes. The value of having the above variety of standard profile dies is that each customer does not have to bear the burden of individual tooling costs.

The vinyl resin is a core material of the mixture. The methyl tin stabilizer is an antioxidant processing aid to enhance heat properties of the stabilizer. Antioxidants in addition to methyl tin stabilizer are contemplated to be within the invention. The titanium dioxide inhibits absorption of ultraviolet rays. The paraffin wax aids in processing flow inside an extruder. The calcium stearate aids in the internal mixing of the mixture inside the extruder. The acrylic polymer modifier is an impact modifier to increase durability properties. Specifically, the base composition of the acrylic polymer modifier may be obtained commercially from Rohm and Haas under the product name "KM940". The acrylic polymer modifier is a blend of three copolymers: butyl acrylate/methyl methacrylate, ethyl acrylate/methyl methacrylate, and butyl acrylate/methyl methacrylate/ styrene. Calcium carbonate is not currenly used, but could be added. Calcium carbonate is a low cost material which provides additional stiffness properties to the mixture.

The PVC blend preferably comprises vinyl resin consisting of 70% to 95% of the mixture by weight, methyl tin stabilizer consisting of 0.5% to 2% of the mixture by weight, titanium dioxide consisting of 0.1% to 12% of the mixture by weight, paraffin wax consisting of 0.5% to 2.0% of the mixture by weight, calcium stearate consisting of 0.5% to 2.0% of the mixture by weight, acrylic polymer modifier consisting of 0.5% to 12% of the mixture by weight, and calcium carbonate, when present, consisting of 1% to 15% of the mixture by weight. The specific levels of acrylic polymer modifier give the PVC blend a favorable balance of strength, stiffness and energy absorption capability.

As stated, the cross members 18 and support members 12, along with other components of the pallet 10, are bonded together by adhesion of a bonding agent sandwiched therebetween. The bonding agent may be selected from one or more of the group consisting of hot-melt moisture-cure polyurethane adhesives, polyester adhesives, polyurethane adhesives, epoxies, cyanoacrylate adhesives, ethyl methyl acrylate adhesives, ethyl vinyl acetate adhesives, hot-melt adhesives and thermoplastic elastomer adhesives.

In the most preferred embodiment, the bonding agent is a hot-melt moisture-cure polyurethane adhesive which allows for high speed assembly and high ultimate bond strength. Such an adhesive is commercially available from H. B. Fuller Company and is the subject matter of U.S. Pat. Nos. 4,775,719 to Markevka et al., 4,808,255 to Markevka et al., and 5,441,808 to Anderson et al. This adhesive is a member of a family of hybrid adhesives that combines the favorable properties of hot-melt adhesives such as rapid green strength development with the favorable properties of thermosetting, adhesives such as high long-term bond strength and low creep. Because the hot-melt component of the preferred bonding agent gives the PVC pallet substantial green strength immediately after bonding, it allows for rapid pallet assembly using hot-melt manual, semiautomated or fully automated applicator systems. On the other hand, because the thermosetting component of the proprietary bonding material gives the PVC pallet high long-term bonding strength and low creep, it allows the pallet to sustain high loads associated with pallet use. It is important to emphasize that the balance between toughness and strength of this preferred bonding agent works in tandem with the balance between toughness and strength of the previously described PVC composition to distribute stresses uniformly throughout the pallet.

Also, the use of the most preferred bonding agent in assembling the PVC pallets yields significantly higher rates of pallet production and, thus, improved economics over other plastic pallet manufacturing techniques. For example, traditional pallet manufacturing processes include injection molding, structural foam injection molding, rotational molding and thermoforming. Each of these processes is designed to manufacture one pallet or crate at a time utilizing individual tools with an approximate cycle time of 2.5 minutes to 5 minutes apiece. Each product is customer and size specific. Conventional methods in fabricating these pallets require heat from the external surface of the pallet to the core of the pallet. To build the core to fusion temperature requires a much higher external temperature which causes a slower build to temperature and a slower cool back to set temperature. However, an assembly system for the present invention will be able to process two to four pallets per minute. The nominal net effect is that conventional plastic processing systems can manufacture 15–24 pallets per hour, but the invention enables processing as many as 240 pallets per hour.

Additionally, the use of the bonding agent in assembling the PVC pallets leads to a relatively "environmentally friendly" operation. For example, no volatile organic solvents are required in the adhesive application or cure thereof.

The profiles which make up the PVC pallet are preferably pretreated to enhance their receptiveness to the bonding agent. At least those surfaces on the PVC profiles which contact the bonding agent are pretreated. The pretreating may consist of abrading, solvent wiping, coating with primer, flame treating, corona discharge treating, electrical etching, plasma treating, or combinations of the above. Flame treatment and plasma treatment are the current preferred methods. Whatever its form, the pretreatment functions to clean the surface of a PVC profile by removing any low molecular weight organics that may inhibit bonding such as oils, lubricants and processing oils. The resultant surface of the PVC profile increases the surface tension of the profile to promote good wetting of the adhesive thereon. Particularly, the profile preferably has a surface tension equal to or greater than 38 dynes/cm$^2$ after the pretreatment.

Furthermore, the adhesively bonded PVC pallets can be efficiently recycled or reused. An amount of up to 25% internal regrind can be used in the PVC extrusion process without negative effects on extruded PVC profiles.

Moreover, if the pallet or crate becomes damaged, it can be repaired utilizing a number of methods depending on the extent of the damage. For example, minor cuts and cracks can be repaired using solvent welding techniques common to PVC or other adhesive and welding techniques common to plastics. Minor holes can be patched using PVC sheet and any of the aforementioned bonding or welding techniques. If a profile lineal on a pallet or crate becomes damaged beyond repair, it can be removed by cleaning or cutting the bonding area with the use of heat if necessary and the entire lineal can be removed. A new lineal can then be bonded onto the pallet or crate utilizing the aforementioned bonding agent. The result is an undamaged full pallet or crate which will function as new. The repairability increases the life of the pallet or crate and reduces the life cycle cost. Also, any damaged component or whole pallet or crate which is damaged beyond repair can be ground and reprocessed back through the twin screw extrusion process.

The repair aspect of the pallets is critical. Pallets and crates get abused and damaged during use. The traditional method for repairing a wood pallet or crate is to cut the nails and replace the boards or blocks. Also, other plastic pallets, which are repairable, utilize nails or other mechanical fasteners which substantially weaken the pallets or crates and are considered only partially repairable. Additionally, the majority of plastic pallets are single formed blocks of plastic, either injection molded or twin sheet thermoformed, both of which are dramatically more expensive, more difficult to repair, and meet less of the marketplace demands than the invention.

Moreover, the pallet and crate material of the present invention generally has a UL94 V-O flammability rating which means it is self-extinguishing. This feature is a significant safety advantage.

The present preferred method for fabricating the PVC pallets according to the invention is as follows. First, the appropriate PVC support members, cross members, etc., are provided. These components are pretreated by performing one or more of the pretreatment methods discussed above. Next, using a table-top template, support members are arranged in parallel spaced relation, with the top surface of each support member facing upward. A bonding agent is then applied to each of the support members on the top surface thereof. Preferably, the bonding agent is supplied using a hot glue gun and is applied in the form of a bead. A cross member is then placed on top of the support member to sandwich the bonding agent therebetween. Further cross members are applied to define the top deck of the pallet, as desired.

The pallet may then be flipped over and a bottom frame applied to the bottom surface of the support members, using the bonding agent as discussed above. Most preferably, however, the bottom frame is first placed on the template, the support members bonded thereto and the cross members then bonded to the top surfaces of the support members. Thus, the flipping step can be eliminated with the present invention.

When using the most preferred hot-melt polyurethane moisture-cure adhesive, the fabrication of the PVC pallet is carried out under ambient temperature in the range of about 60° F. to about 100° F. and under ambient relative humidity of about 40% to about 85%. The surface temperature of the PVC support members and cross members, as measured by a surface pyrometer, is greater than 60° F. and preferably greater than 70° F. The hot-melt polyurethane moisture-cure adhesive is applied at a temperature between 275°–375° F., and preferably between 325°–350° F.

The pallets are currently assembled manually, but it is anticipated that the pallets according to the invention may also be fabricated using automated means.

Pallets according to the invention have been broad based tested under the requirements as specified by ISO 8611 "General Purpose Flat Pallets for Through Transit of Goods-Test Methods" and have been evaluated under the ISO TR 10233 "Performance Requirements." The test results demonstrate that the pallet is rackable. A majority of the pallet consuming marketplace is designed to rack a pallet in warehouses. The rack comprises a pallet that is suspended front to back or side to side. The PVC pallet of the invention is a multi-life, durable, lightweight, flame retardant, and economic pallet which racks at high loads.

Figure 13:
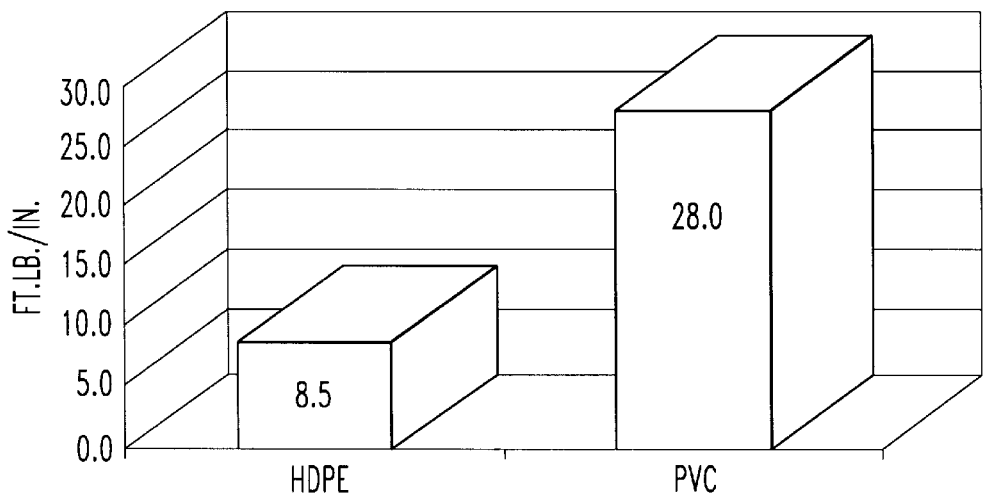
FIG. 13 is a bar graph showing ASTM D-256 Notched Izod Impact Test results for the PVC structural product of the present invention, compared to high density polyethylene ("HDPE")

FIGS. 13–20 show the results of extensive testing on pallets built according to the present invention. FIG. 13 shows the results of a Notched Izod Impact Test (ASTM D-256) at room temperature for a PVC structural product utilizing the PVC blend of the present invention as compared to high-density polyethylene ("HDPE"). The PVC compound of the present invention exhibits significantly better impact strength than HDPE. This is important since 99% of all other plastic pallets currently being manufactured in the world are manufactured from HDPE. Impact strength and durability go hand and hand. This data suggests that pallets built according to the present invention would have better durability than most HDPE pallets.

Figure 14:
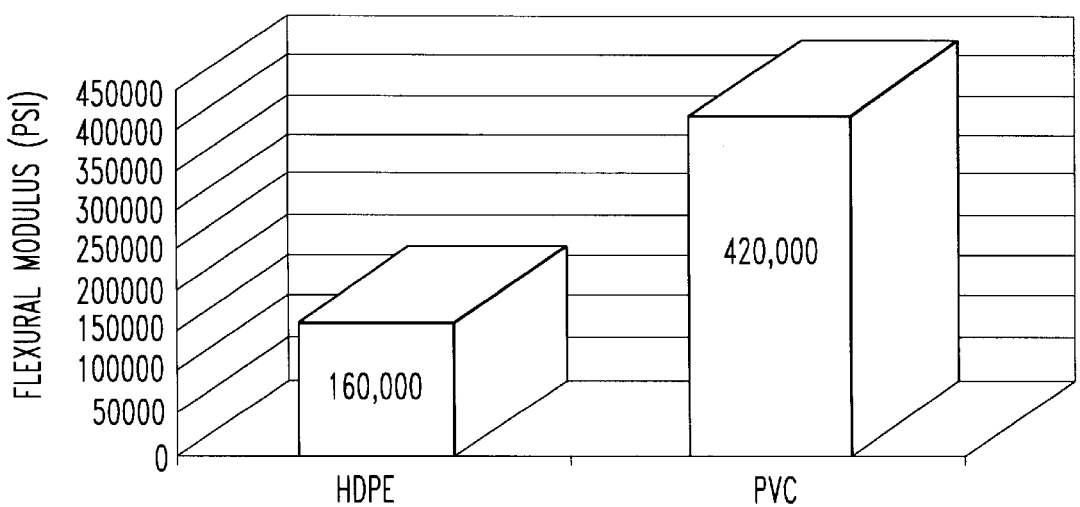
FIG. 14 is a bar graph showing ASTM D-790 Flexural Modulus Test results for the PVC structural product of the present invention, compared to HDPE.

FIG. 14 compares the flexural modulus of HDPE with the PVC compound of the present invention when subjected to testing according to ASTM D-790. This test determines the force necessary to bend a sample of the plastic and is directly proportional to the load or weight that pallets can carry and rack. Pallets built with the PVC compound of the present invention can handle much heavier loads than similar pallets manufactured from HDPE. These test results indicate that pallets according to the invention can be utilized in almost any application for which a wood pallet is currently used. By contrast, an all plastic HDPE pallet is limited to that portion of the marketplace that only carries lighter loads. This is a significant advantage in the marketplace.

The table in FIG. 15 contains comparative test results for two (2) extruded PVC profiles utilizing PVC compounds according to the present invention ("1A" and "1B"), as well as a PVC profile extruded from a typical rigid PVC formulation ("control"). The Gardner Impact (ASTM D-3029) and Izod Impact (ASTM D-256) results clearly demonstrate that PVC structural products utilizing the PVC blend of the present invention have been custom designed to exhibit significantly higher impact strength than a typical rigid PVC compound. Again, this translates to significantly better pallet durability. It is also important to note that compounds 1A and 1B, according to the invention, have significantly better impact strength at low temperatures. This is critical in pallets, since they are utilized in a wide range of weather and temperature conditions. The lower half of the table in FIG. 15 details various tensile strength, elongation, flexural strength, flexural modulus and Izod Impact Test results for samples of the control compound and PVC compounds 1A and 1B according to the invention. These samples were not extruded PVC profiles, but rather were taken from two-roll milled and compression molded PVC.

Figure 17:
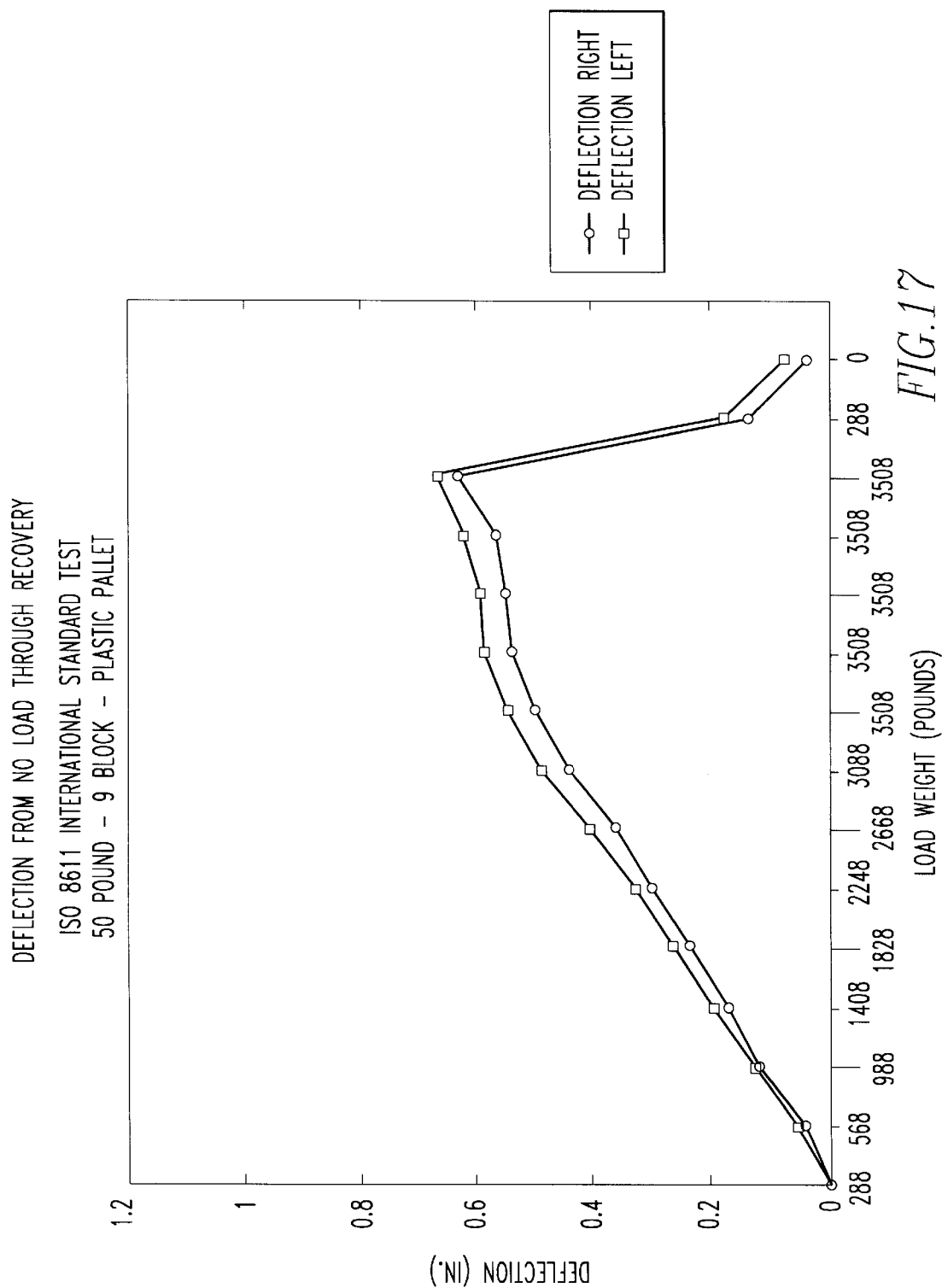
FIG. 17 is a line graph showing deflection of a pallet according to the invention, from no load through recovery, when tested under an ISO 8611 Rack Test.
Figure 18:
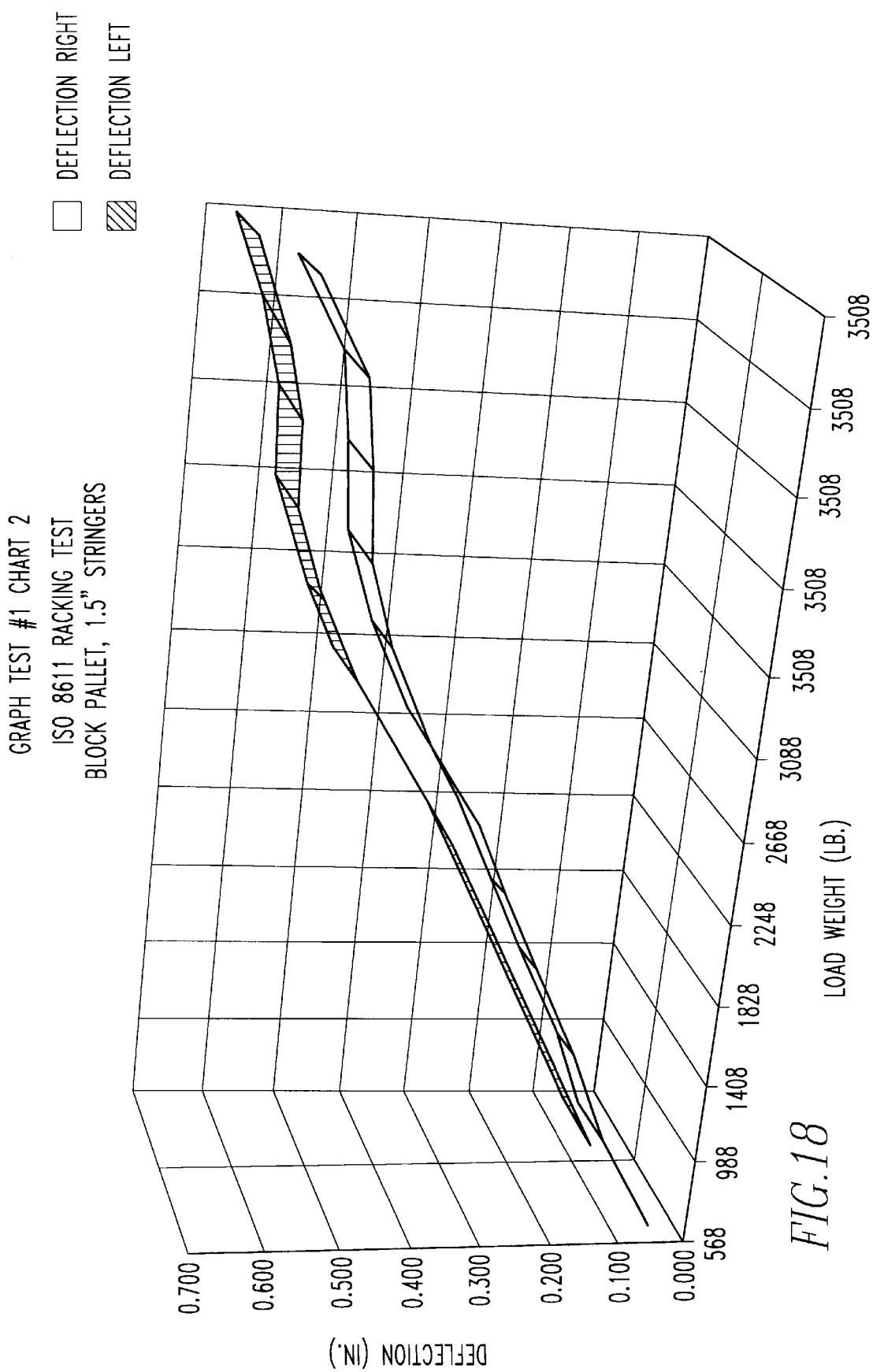
FIG. 18 is a line graph showing deflection vs. load weight for a block pallet with 1.5" stringers according to the invention in an ISO 8611 Rack Test, indicating right side pallet deflection and left side pallet deflection.

FIGS. 16–18 are a table and two graphs detailing the results of an ISO 8611 racking test for a 40"×48", 50 pound 9 block PVC pallet according to the invention, racked across 48". Thirty-five hundred (3,500) pounds, in the form of cement blocks, was suspended at the weakest point of the pallet. ISO 8611 was originally designed for wood pallets, and the maximum allowable deflection for a 40"×48" wood pallet according to this test is a little over 1". This requirement must be met at a weight of the pallet's rated capacity plus 25%. The PVC pallet according to the invention met the requirements of this standard for a rated capacity of twenty-eight hundred (2,800) pounds. Numerous plastic pallets have been subjected to this test in the past, and the PVC plastic pallet according to the present invention was the first all-plastic pallet that the inventors have ever seen pass this requirement. The performance of the pallet according to the invention in this test is equivalent to the highest quality wood pallets on the market.

Figure 19:
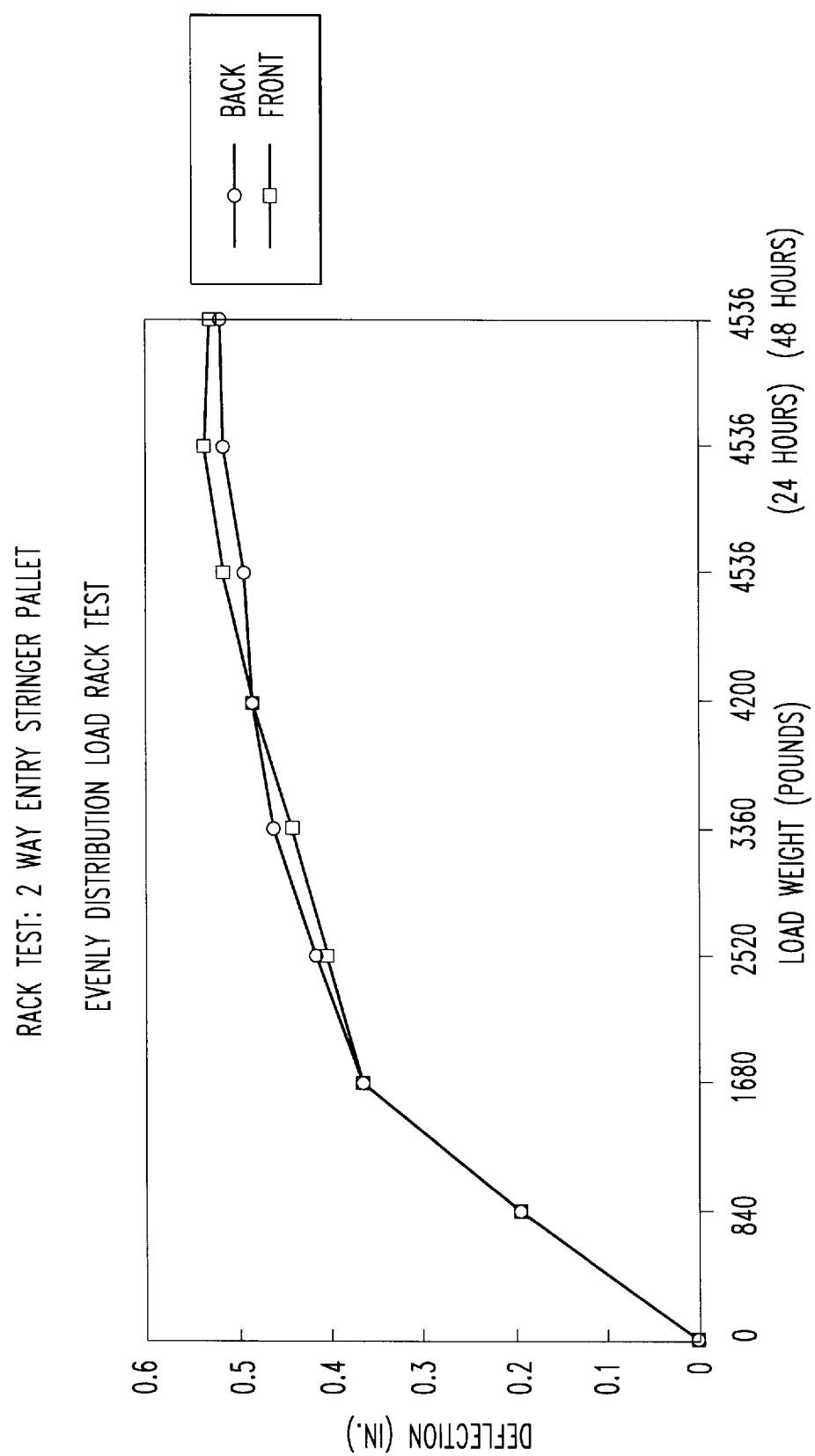
FIG. 19 is a line graph showing deflection vs. load weight for a two-way stringer pallet according to the invention, in an evenly distributed load weight test, indicating front side deflection and back side deflection.

FIG. 19 shows the results of a rack test performed on a two-way entry stringer pallet built according to the invention, using an evenly distributed load of 4,536 pounds which is an extremely heavy load. Even with the extremely heavy load, the deflection of the pallet was well under one (1) inch. This was a short-term deflection test.

FIG. 20 shows the results of a long-term deflection test. One of the problems with all-plastic pallets is that when they are left under load, they continue to move or creep. This is related to, among other things, the flexural modulus of a plastic, and HDPE pallets perform poorly on this type of test. By contrast, the PVC pallet according to the present invention is still well below the maximum allowable deflection of slightly over 1", even after 150 days of being racked under load. This clearly demonstrates that PVC pallets according to the present invention could be used to rack loads of up to 4,536 pounds, or maybe higher, in a safe manner. The inventors are aware of no other plastic pallets in the world which could accomplish this task.

Having described the presently preferred embodiments of the invention, it will be apparent to those skilled in the art that certain variations and modifications may be made to the invention without departing from the spirit and scope of the invention. Thus, it is not intended to limit the invention except as set forth in the following claims.

What is claimed is:

1. A method of making a PVC pallet or crate comprising the steps of:
   a) providing a plurality of PVC support members;
   b) pretreating the support members and cross members by performing one or more of the group consisting of flame treatment, corona discharge, solvent wiping, abrading, coating with a primer, plasma treatment and electrical etching;
   c) arranging the support members in parallel, spaced relation, with a top surface on each support member facing substantially upward;
   d) applying a bonding agent to each of said support members on the top surface thereof, said bonding agent selected from one or more of the group consisting of hot-melt moisture-cure polyurethane adhesives, polyester adhesives, epoxies, cyanoacrylate adhesives, polyurethane adhesives, ethyl methyl acrylate adhesives, ethyl vinyl acetate adhesives, hot-melt adhesives and thermoplastic elastomer adhesives;
   e) providing at least one PVC cross member; and
   f) transversely positioning said cross member on the top surface of said support members so as to sandwich said bonding agent therebetween.

2. The method of claim 1 wherein said method is carried out under an ambient temperature in the range of about 60° F. to about 100° F. and under ambient relative humidity of about 40% to about 85%.

3. The method of claim 1 wherein the surface temperature of the PVC support members and cross members is greater than 60° F.

4. The method of claim 1 wherein the temperature of said bonding agent when applied is between 275° F. and 375° F.

5. The method of claim 1 including in step a) the steps of extruding said support members and cross members so that they are hollow with quadrangular cross-sections, and cutting the support members and cross members to length.

6. The method of claim 5 including in step a) the step of extruding one or more of the support members and cross members so as to provide them with at least one internal reinforcing rib.

7. The method of claim 1 wherein in step d) said bonding agent is applied in the form of a bead.

* * * * *